/ United States Patent /
Lee et al.

US 9,314,876 B2
(10) Patent No.:
(45) Date of Patent: Apr. 19, 2016

(54) LASER WELDING DEVICE

(71) Applicant: Hyundai Motor Company, Seoul (KR)

(72) Inventors: Junkyoung Lee, Incheon (KR);
Hyunwoo Lee, Ulsan (KR)

(73) Assignee: Hyundai Motor Company, Seoul (KR)

( * ) Notice: Subject to any disclaimer, the term of this patent is extended or adjusted under 35 U.S.C. 154(b) by 293 days.

(21) Appl. No.: 14/144,115

(22) Filed: Dec. 30, 2013

(65) Prior Publication Data

US 2015/0102021 A1    Apr. 16, 2015

(30) Foreign Application Priority Data

Oct. 15, 2013  (KR) .................. 10-2013-0122800

(51) Int. Cl.
| | |
|---|---|
| *B23K 26/00* | (2014.01) |
| *B23K 26/02* | (2014.01) |
| *B23K 26/24* | (2014.01) |
| *B23K 26/08* | (2014.01) |
| *B23K 37/04* | (2006.01) |
| *B23K 26/32* | (2014.01) |

(52) U.S. Cl.
CPC .............. *B23K 26/24* (2013.01); *B23K 26/082* (2015.10); *B23K 26/0807* (2013.01); *B23K 26/0823* (2013.01); *B23K 26/32* (2013.01); *B23K 37/0435* (2013.01); *B23K 2201/36* (2013.01); *B23K 2201/40* (2013.01); *B23K 2203/50* (2015.10)

(58) Field of Classification Search
CPC ........... B23K 2201/36; B23K 2201/40; B23K 2203/50; B23K 26/06–26/0652; B23K 26/08–26/082; B23K 26/0823; B23K 26/24; B23K 26/32; B23K 37/0435

USPC .......................................... 219/121.6–121.83
See application file for complete search history.

(56) References Cited

U.S. PATENT DOCUMENTS

| | | | | | |
|---|---|---|---|---|---|
| 4,335,296 | A | * | 6/1982 | Bredow ............. | B23K 26/0853 219/121.67 |
| 4,459,458 | A | * | 7/1984 | Vetsch ................. | B23P 25/003 219/121.6 |
| 4,940,880 | A | * | 7/1990 | Klingel .............. | B23K 26/0853 219/121.67 |
| 5,324,913 | A | * | 6/1994 | Oberg ................. | B23K 26/037 219/121.63 |
| 2008/0261382 | A1 | * | 10/2008 | Starodoumov ..... | B23K 26/0006 438/463 |
| 2011/0284510 | A1 | * | 11/2011 | Reeves-Hall ........ | B23K 26/032 219/121.72 |

FOREIGN PATENT DOCUMENTS

| | | |
|---|---|---|
| JP | 3596286 B2 | 11/1999 |
| JP | 4239274 B2 | 9/2000 |
| KR | 10-0491689 B1 | 3/2001 |

* cited by examiner

*Primary Examiner* — Sang Y Paik
(74) *Attorney, Agent, or Firm* — Morgan, Lewis & Bockius LLP

(57) ABSTRACT

A laser welding device may include: a frame including a lower die supporting at least two sheets of welding objects and an upper die mounted over the lower die to be spaced apart from the lower die; a pressing plate movably mounted on the upper die in a vertical direction and pressing the welding objects; a rotating member mounted on the pressing plate and rotating based on a pressing central shaft of the pressing plate; a tilting member disposed in a direction intersecting the pressing central shaft and connected to the rotating member to be tilted in a vertical direction; and a scanner head reciprocally mounted on the tilting member along a length direction, scanning the laser beam in an X axis and a Y axis, and irradiating the laser beam to the welding object.

8 Claims, 6 Drawing Sheets

LASER WELDING DEVICE

CROSS-REFERENCE TO RELATED APPLICATION

The present application claims priority of Korean Patent Application Number 10-2013-0122800 filed Oct. 15, 2013, the entire contents of which application is incorporated herein for all purposes by this reference.

BACKGROUND OF INVENTION

1. Field of Invention

The present invention relates to a laser welding device, and more particularly, to a laser welding device which welds parts, such as a vehicular lamp and a metal bipolar plate of a fuel cell which require air tightness, using laser.

2. Description of Related Art

Generally, a laser welding may be classified into a keyhole welding which uses energy multiple reflection and absorption in a focal section of a laser beam and a conduction welding which uses heat conduction in a non-focal section of the laser beam.

In a general laser welding system for welding materials, such as a steel plate or an aluminum alloy sheet, using the laser beam, a laser head is mounted at a leading end of an arm of a robot and the laser head is connected to a laser oscillator.

The laser head irradiates the laser beam while moving along a welding pattern of a material by the robot which is operated by a robot controller to perform a welding operation of a welding object.

Meanwhile, among vehicle parts, parts requiring air tightness which is an important factor of quality, for example, parts such as a vehicular lamp or a metal bipolar plate of a fuel cell are welded by mainly using the laser beam.

For the laser welding of the parts, it is important to make a gap between at least two sheets of parts zero. To this end, the related art uses a pressing jig pressing the parts which are the welding object and making the gap between the parts zero and a laser head moving in a multi axis.

Herein, the laser welding using the pressing jig may be divided into an open loop welding scheme and a closed loop welding scheme depending on a welded portion pattern.

The open loop welding scheme performs the laser welding on parts depending on a welded portion pattern with a predetermined opened section in the state in which the parts are pressed with the pressing jig. Further, the closed loop welding scheme performs the laser welding on parts depending on a welded portion pattern without the opened section in the state in which the parts are pressed with the pressing jig.

However, in the case of the closed loop welding scheme according to the related art, the laser head irradiates the laser beam while moving along the welded portion pattern from an outside of the pressing jig, such that it is not easy to implement the welded pattern portion of the closed loop due to an interference between the pressing jig and the laser head To improve this, the related art attaches the laser head to a multi-axis robot and uses an expensive pressing jig pressing the parts to implement the welded portion pattern of the closed loop, but it is difficult to rapidly and uniformly perform the laser welding and facility investment cost increases.

The information disclosed in this Background section is only for enhancement of understanding of the general background of the invention and should not be taken as an acknowledgement or any form of suggestion that this information forms the prior art already known to a person skilled in the art.

BRIEF SUMMARY

Various aspects of the present invention provide for a laser welding device capable of avoiding interference between a part irradiating a laser beam and a part pressing welded parts, implementing a welded portion pattern of a closed loop, and promoting a rapid and uniform laser welding of the closed loop.

Various aspects of the present invention provide for a laser welding device including: a frame including a lower die supporting at least two sheets of welding objects and an upper die mounted over the lower die to be spaced apart from the lower die; a pressing plate movably mounted on the upper die in a vertical direction and pressing the welding objects; a rotating member mounted on the pressing plate and rotating based on a pressing central shaft of the pressing plate; a tilting member disposed in a direction intersecting the pressing central shaft and connected to the rotating member to be tilted in a vertical direction; and a scanner head reciprocally mounted on the tilting member along a length direction, scanning the laser beam in an X axis and a Y axis, and irradiating the laser beam to the welding object.

The laser welding device may further include: an optical system mounted on the tilting member and reflecting a laser beam oscillated from a laser oscillator to the scanner head.

The scanner head may include a main body reciprocally mounted on the tilting member through a moving unit; an X-axis scanning mirror rotatably mounted on the main body in an X-axis direction and scanning the laser beam in an X axis; and a Y-axis scanning mirror rotatably mounted on the main body in a Y-axis direction and scanning the laser beam in a Y axis.

The X-axis scanning mirror may rotate by a first servo motor which is mounted on the main body, and the Y-axis scanning mirror may rotate by a second servo motor which is mounted on the main body.

The laser welding device may further include: a pressing cylinder mounted on the upper die and connected to the pressing plate through the operating rod.

The rotating member may have a cylindrical shape through which the operating rod penetrates and a lower end of the rotating member may be rotatably supported to an upper surface of the pressing plate.

The laser welding device may further include: a first drive motor mounted on the upper surface of the pressing plate and providing a torque to the rotating member; and a second drive motor mounted on the upper surface of the pressing plate and providing a torque to the tilting member.

The moving unit may include a third drive motor which is mounted on the tilting member and convert a rotating motion of the third drive motor into a linear reciprocal motion of the main body.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Figure 1:
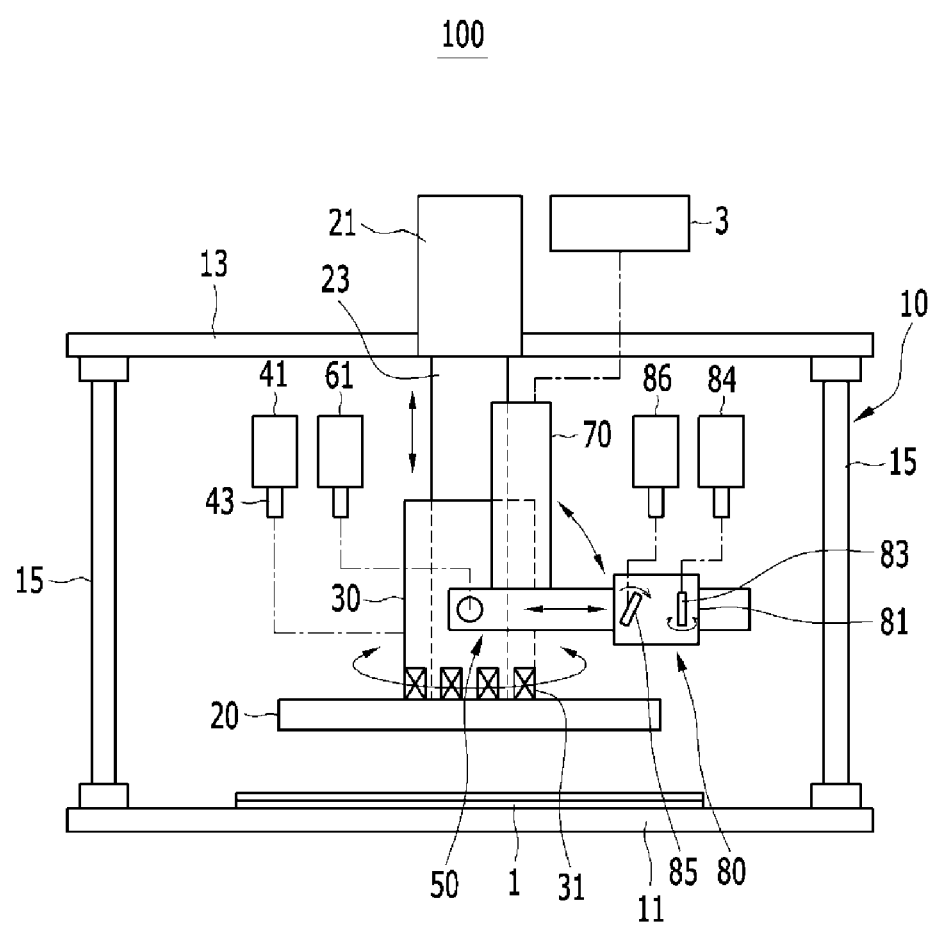
FIG. 1 is a front configuration diagram schematically illustrating an exemplary laser welding device according to the present invention.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Accordingly, the drawings and description are to be regarded as illustrative in nature and not restrictive. Like reference numerals designate like elements throughout the specification.

In addition, the size and thickness of each configuration shown in the drawings are arbitrarily shown for understanding and ease of description, but the present invention is not limited thereto and the thickness of layers, films, panels, regions, etc., are exaggerated for clarity.

Further, differentiating names for components into first, second, and the like in the following detailed description is to merely differentiate the components since the components are the same and an order thereof is not necessarily limited in the following description.

Throughout the specification, unless explicitly described to the contrary, the word "comprise" and variations such as "comprises" or "comprising", will be understood to imply the inclusion of stated elements but not the exclusion of any other elements.

In addition, the terms " . . . unit", " . . . means", " . . . part", and " . . . member" described in the specification mean units of a general configuration performing at least one function or operation.

Figure 2:
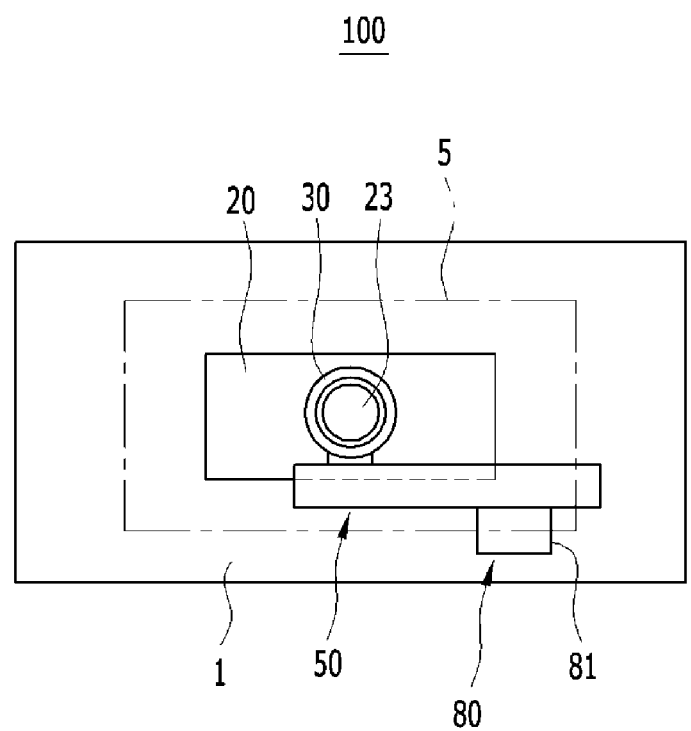
FIG. 2 is a plan configuration diagram schematically illustrating an exemplary laser welding device according to the present invention.

FIGS. 1 and 2 are front and plan configuration diagrams schematically illustrating a laser welding device according to various embodiments of the present invention.

Referring to FIGS. 1 and 2, a laser welding device 100 according to various embodiments of the present invention is to press a welding object 1 which is at least two sheets of metallic panels and weld the welding object 1 using a laser beam 2 (hereinafter, see FIG. 5).

For example, the laser welding device 100 is a part requiring air tightness and is to weld a metal body of a vehicular lamp and a metal bipolar plate of a fuel cell using laser. Herein, the welding object 1 may include at least two sheets of metallic material panels which are folded in a plane form or a form having a curve.

The laser welding device 100 according to various embodiments of the present invention may make a gap between the metal material panels of the welding object 1 zero, avoid an interference between a part irradiating a laser beam 2 and a part pressing the welding object 1, implement a welded portion pattern 5 of a closed loop, and promote the rapid and uniform laser welding of the closed loop.

To this end, the laser welding device 100 according to various embodiments of the present invention basically includes a frame 10, a pressing plate 20, a rotating member 30, a tilting member 50, an optical system 70, and a scanner head 80.

The frame 10 supports main components of the laser welding device 100 and includes subsidiary elements, such as various blocks, plates, housings, covers, colors, and the like for supporting the components.

However, the above-mentioned subsidiary elements are to mount each component on the frame 10 and therefore in various embodiments of the present invention, the subsidiary elements are collectively referred to as the frame 10, except for the exceptional case.

Herein, the frame 10 includes a lower die 11 and an upper die 13 which is mounted over the lower die 11 at a predetermined interval. The lower die 11 supports the welding object 1. The upper die 13 is mounted over the lower die 11 through a plurality of support rods 15 to be spaced apart from the lower die 11.

The pressing plate 20 is to press the welding object 1 by a press scheme. The pressing plate 20 is movably mounted on the upper die 13 in a vertical direction, corresponding to the lower die 11.

Herein, the pressing plate 20 may press the welding object 1 on the lower die 11 by a pressing cylinder 21. The pressing cylinder 21 is a hydraulic cylinder or a pneumatic cylinder and is fixedly mounted on the upper die 13.

The pressing cylinder 21 is provided with an operating rod 23 which vertically advances and retreats with respect to the lower die 11. The operating rod 23 is connected to a center of an upper surface of the pressing plate 20.

The rotating member 30 is mounted on the pressing plate 20 to rotate based on a pressing central shaft of the pressing plate 20. The rotating member 30 has a hollow cylindrical shape through which the operating rod 23 of the pressing cylinder 21 penetrates. In this case, a lower end of the rotating member 30 is rotatably supported to an upper surface of the pressing plate 20 through a bearing 31.

Further, the rotating member 30 may rotate based on the pressing central shaft of the pressing plate 20 by a first drive motor 41. The first drive motor 41 provides a torque to the rotating member 30 and is fixedly mounted on the upper surface of the pressing plate 20.

Figure 3:
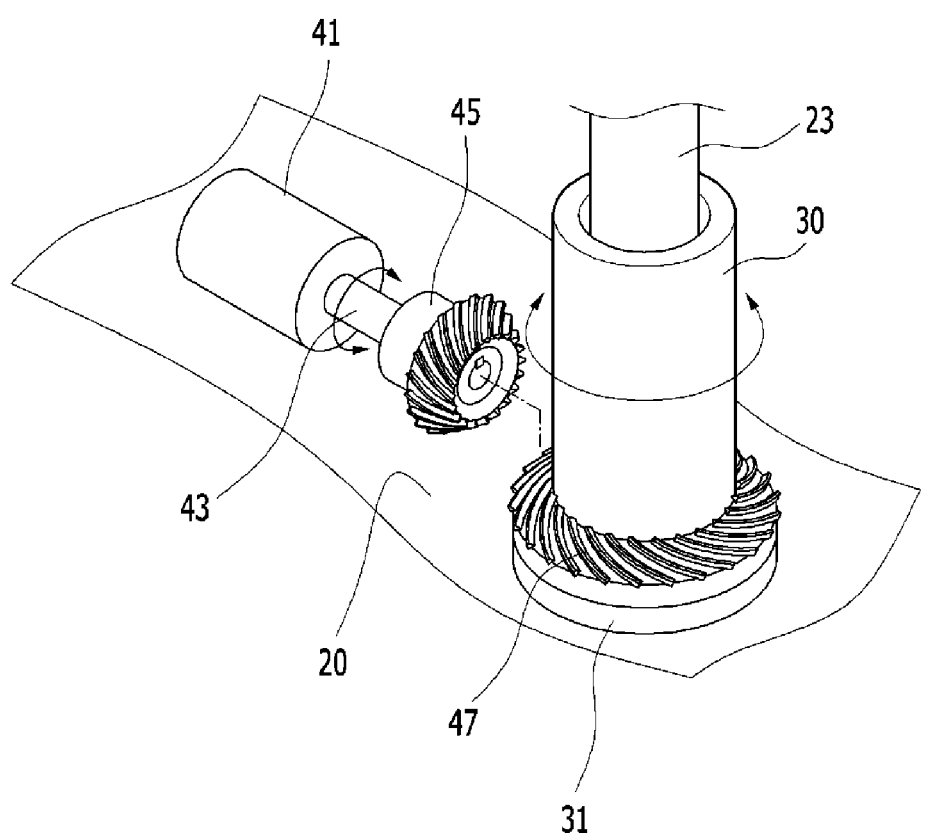
FIG. 3 is a diagram schematically illustrating a rotating structure of a rotating member applied to an exemplary laser welding device according to the present invention.

For example, as illustrated in FIG. 3, a rotating shaft 43 of the first drive motor 41 is provided with a helical gear 45, in which the helical gear 45 may be engaged with a gear train 47 which is arranged along a lower circumferential direction of the rotating member 30.

Therefore, when the helical gear 45 rotates along with the rotating shaft 43 by the driving of the first drive motor 41, the helical gear 45 is engaged with the gear train 47 of the rotating member 30, such that the rotating member 30 may rotate in the state in which the rotating member 30 is supported to the bearing 31 on the upper surface of the pressing plate 20.

The tilting member 50 is disposed in an direction intersecting the pressing central shaft of the pressing plate 20 and is connected to the rotating member 30 to be tilted in a vertical direction. The tilting member 50 may rotate by a second drive motor 61. The second drive motor 61 provides a torque to the tilting member 50 and is fixedly mounted on the upper surface of the pressing plate 20.

The tilting member 50 may be tilted vertically by the second drive motor 61 depending on a curved displacement of the welding object 1 and a focal position of the laser beam 2 with respect to the welded portion pattern 5 of the welding object 1.

The optical system 70 moves the laser beam 2 oscillated from the laser oscillator 3 to a given path and is mounted in the tilting member 50. The optical system 70 may include a lens and a mirror which reflect the laser beam 2.

That is, the optical system 70 has a function of reflecting the laser beam 2 oscillated from the laser oscillator 3 to a scanner head 80 to be described in detail below through the lens, the mirror, and the like.

The optical system 70 is configured of a known optical device which is disposed in a laser scanner widely known to those skilled in the art and therefore the detailed description thereof will be omitted in the present specification.

The scanner head 80 scans the laser beam 2 moving through the optical system 70 in an X axis and a Y axis and is to irradiate the laser beam 2 to the welding object 1. The scanner head 80 may be reciprocally mounted on the tilting member 50 in a length direction of the tilting member 50. The scanner head 80 includes a main body 81, an X-axis scanning mirror 83, and a Y-axis scanning mirror 85.

The main body 81 may be reciprocally mounted on the tilting member 50 through a moving unit 91. The X-axis scanning mirror 83 is rotatably mounted at one side of the main body 81 in an X-axis direction and scans the laser beam 2 in the X axis. The Y-axis scanning mirror 85 is rotatably mounted at the other side of the main body 81 in a Y-axis direction and scans the laser beam 2 in the Y axis.

Figure 4:
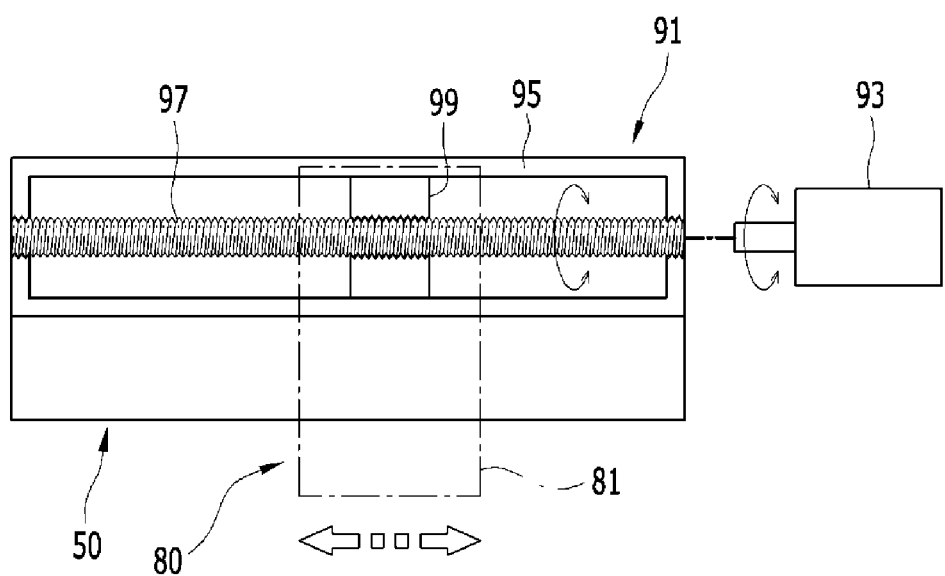
FIG. 4 is a diagram schematically illustrating a moving structure of a scanner head applied to an exemplary laser welding device according to the present invention.

In the above description, as illustrated in FIG. 4, the moving unit 91 includes a third drive motor 93 which is fixedly mounted on the tilting member 50. The moving unit 91 serves to convert a rotating motion of the third drive motor 93 into a linear motion of the main body 81.

To this end, the moving unit 91 includes a guide member 95 which is mounted on the tilting member 50 along a length direction, a lead screw 97 which is connected to the third drive motor 93 and rotatably mounted on the guide member 95, and a moving block 99 which is connected to a main body 81 and is screw connected to the lead screw 97.

In this case, the third drive motor 93 may be connected to the lead screw 97 by a bevel gear (not illustrated) widely known to those skilled in the art. That is, a rotating shaft (not illustrated) of the third drive motor 93 and the two shafts of the lead screw 97 intersect each other and may be connected to each other by the bevel gear.

Therefore, when the third drive motor 93 is driven, the lead screw 97 rotates and the moving block 99 linearly moves along the lead screw 97, such that the main body 81 may reciprocally move along the length direction of the tilting member 50.

Further, the X-axis scanning mirror 83 may rotate by the first servo motor 84 which is mounted at one side of the main body 81 and the Y-axis scanning mirror 85 may rotate by the second servo motor 86 which is mounted at the other side of the main body 81.

Hereinafter, the operation of the laser welding device according to various embodiments of the present invention configured as described above will be described in detail with reference to the foregoing drawings and the accompanying drawings.

Figure 5:
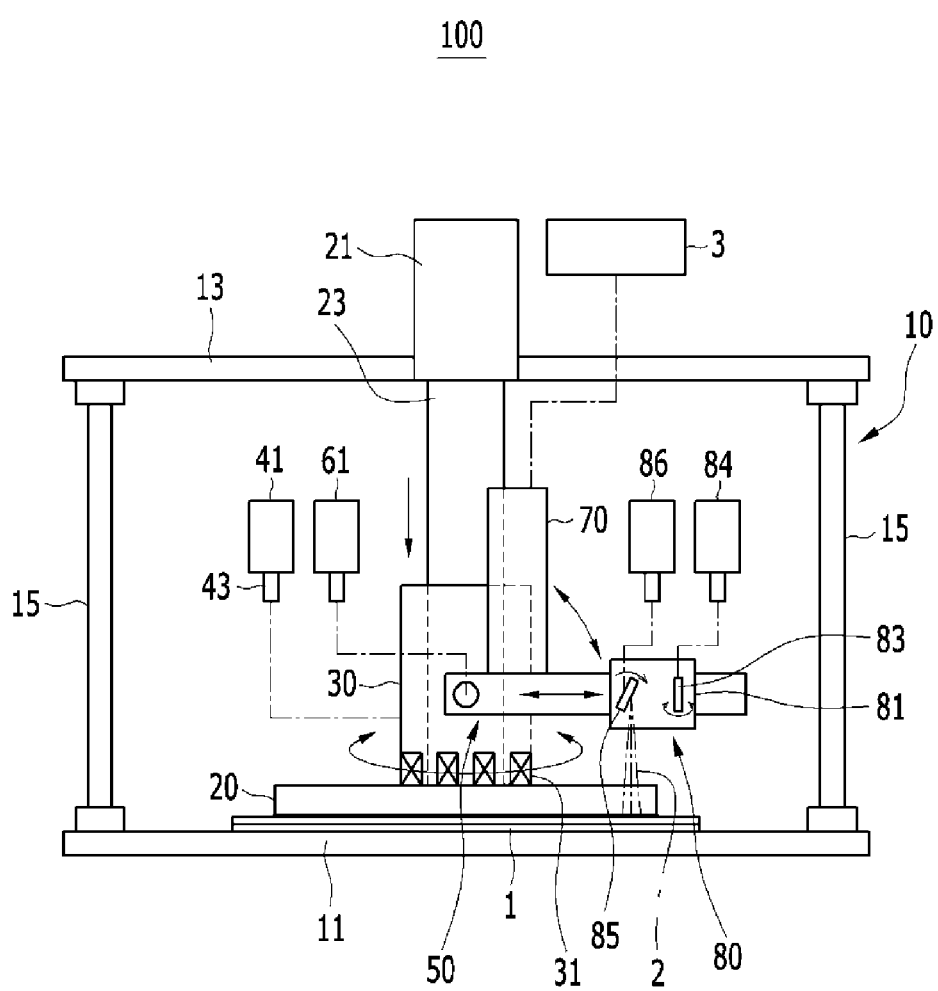
FIG. 5 and FIG. 6 are diagrams for describing an operation of an exemplary laser welding device according to the present invention.
Figure 6:
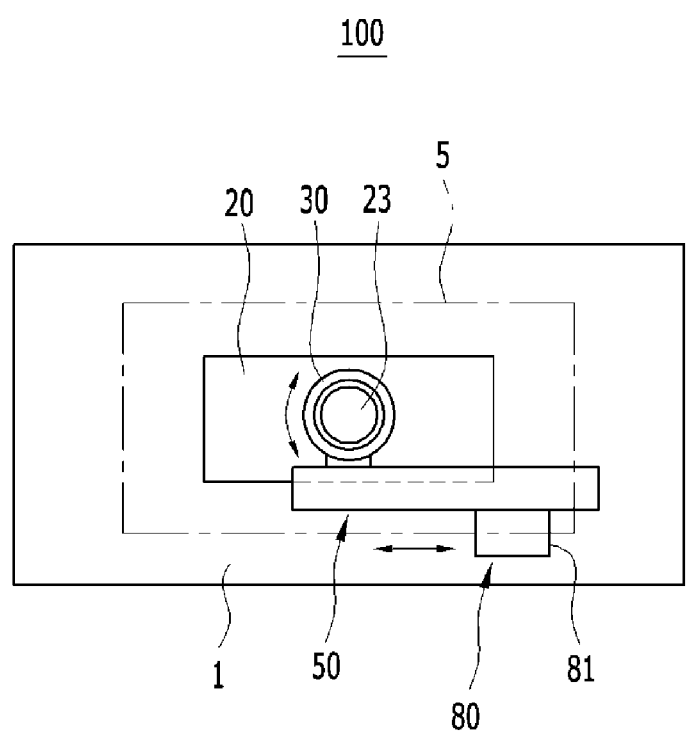

FIGS. 5 and 6 are diagrams for describing an operation of the laser welding device according to various embodiments of the present invention.

Referring to FIG. 1, according to various embodiments of the present invention, the welding object 1 in which two sheets of metal material panels are folded is loaded on the lower die 11 of the frame 10.

In this case, the pressing plate 20 is in the state in which the pressing plate 20 moves up from the lower die 11 while the operating rod 23 of the pressing cylinder 21 retreating up and the scanner head 80 is in the state in which the scanner head 80 moves to one end of the tilting member 50.

In this state, according to various embodiments of the present invention, as illustrated in FIG. 5, the operating rod 23 of the pressing cylinder 21 advances down. Next, the pressing plate 20 presses the welding object 1 on the lower die 11 at a predetermined pressure by the pressing cylinder 21.

Herein, the pressing plate 20 presses the welding object 1 within the desired welded portion pattern 5 (hereinafter, see FIG. 6) of the welding object 1, that is, the welded portion pattern 5 of the closed loop.

Next, according to various embodiments of the present invention, the laser beam 2 oscillated from the laser oscillator 3 moves to the given path through the optical system 70 and is emitted to the scanner head 80.

In the process, according to various embodiments of the present invention, as illustrated in FIGS. 5 and 6, the X-axis scanning mirror 83 and the Y-axis scanning mirror 85 of the scanner head 80 rotate in the X-axis and Y-axis directions through the first and second servo motors 84 and 86 at the welding initial position of the welding object 1 and scan the laser beam 2 in the X-axis and Y-axis directions.

Further, according to various embodiments of the present invention, the tilting member 50 rotates in a vertical direction (Z-axis direction) by the second drive motor 61 and the focal position of the laser beam 2 is adjusted in the Z-axis direction.

At the same time, according to various embodiments of the present invention, the scanner head 80 reciprocally moves in a linear direction along the predetermined welded portion pattern 5 through the moving unit 91, the rotating member 30 rotates by the first drive motor 41, and the laser beam 2 is irradiated to the welding object 1 through the scanner head 80.

Next, according to various embodiments of the present invention, the laser beam 2 is irradiated to the welded object 1 through the scanner head 80 depending on the predetermined welded portion pattern 5 to perform the laser welding on the welding object 1.

Meanwhile, according to various embodiments of the present invention, the X-axis and Y-axis scanning mirrors 83 and 85 of the scanner head 80 may be adjusted in the X-axis and Y-axis directions through the first and second servo motors 84 and 86 depending on the curved displacement of the welding object 1, the laser beam 2 may be scanned in the X-axis and Y-axis directions, the tilting member 50 may be vertically tilted by the second drive motor 61, and the focal position of the laser beam 2 may be adjusted in the Z-axis direction.

Therefore, according to various embodiments of the present invention, in the state in which the welding object 1 is pressed by the pressing plate 20, the laser beam 2 is irradiated to the predetermined welded portion pattern 5 to implement the welding portion pattern 5 of the closed loop and weld the welding object 1.

According to the laser welding device 100 according to various embodiments of the present invention as described above, the welding object 1 may be pressed by the pressing plate 20 and the gap between the metal material panels of the welding object 1 may be zeroed.

Further, according to various embodiments of the present invention, the scanner head 80 may move, the rotating member 30 may rotate, and the position of the welding object 1 on which the laser beam 2 is concentrated may be changed three-dimensionally, thereby avoiding the interference between the part irradiating the laser beam 2 and the part pressing the welding object 1 and rapidly and uniformly implementing the welding portion pattern 5 of the closed loop.

For convenience in explanation and accurate definition in the appended claims, the terms upper or lower, front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A laser welding device, comprising:
   a frame including a lower die supporting at least two sheets of welding objects and an upper die mounted over the lower die spaced apart from the lower die;
   a pressing plate movably mounted on the upper die in a vertical direction for pressing against the welding objects;
   a rotating member mounted on the pressing plate and rotating in accordance with a pressing central shaft of the pressing plate;
   a tilting member disposed in a direction intersecting the pressing central shaft and connected to the rotating member to be tilted in a vertical direction; and
   a scanner head reciprocally mounted on the tilting member along a length direction, scanning a laser beam in an X axis and a Y axis, and irradiating the laser beam to the welding object.

2. The laser welding device of claim 1, further comprising:
   an optical system mounted on the tilting member and reflecting a laser beam oscillating from a laser oscillator to the scanner head.

3. The laser welding device of claim 1, wherein the scanner head includes:
   a main body reciprocally mounted on the tilting member through a moving unit;
   an X-axis scanning mirror rotatably mounted on the main body in an X-axis direction and scanning the laser beam in an X axis; and
   a Y-axis scanning mirror rotatably mounted on the main body in a Y-axis direction and scanning the laser beam in a Y axis.

4. The laser welding device of claim 3, wherein:
   the X-axis scanning mirror rotates by a first servo motor mounted on the main body; and
   the Y-axis scanning mirror rotates by a second servo motor mounted on the main body.

5. The laser welding device of claim 1, further comprising:
   a pressing cylinder mounted on the upper die and connected to the pressing plate through the operating rod.

6. The laser welding device of claim 5, wherein the rotating member has a cylindrical shape into which the operating rod extends and a lower end of the rotating member is rotatably supported to an upper surface of the pressing plate.

7. The laser welding device of claim 1, further comprising:
   a first drive motor mounted on the upper surface of the pressing plate and providing a torque to the rotating member; and
   a second drive motor mounted on the upper surface of the pressing plate and providing a torque to the tilting member.

8. The laser welding device of claim 3, wherein the moving unit includes a third drive motor which is mounted on the tilting member and converts a rotating motion of the third drive motor into a linear reciprocal motion of the main body.

* * * * *